July 31, 1956  J. J. McELHONE ET AL  2,757,263
MASTER SWITCH FOR AUTOMOBILES
Filed March 31, 1954
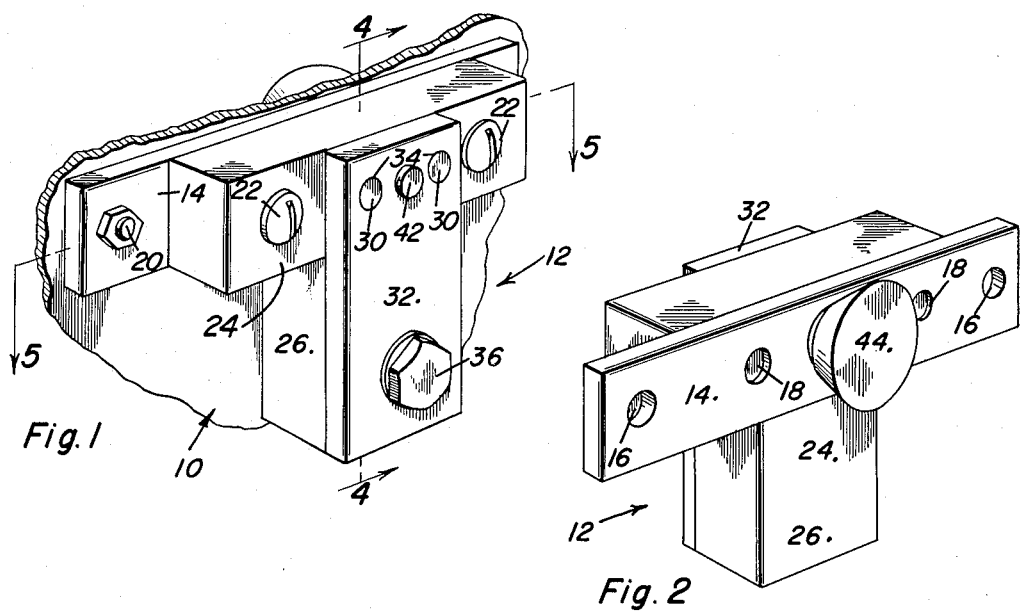
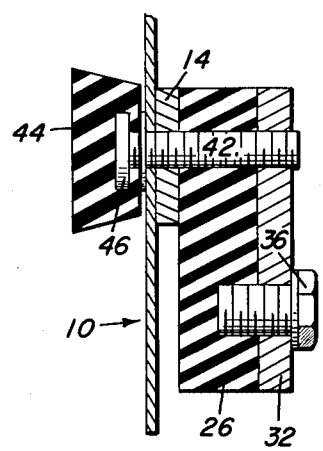
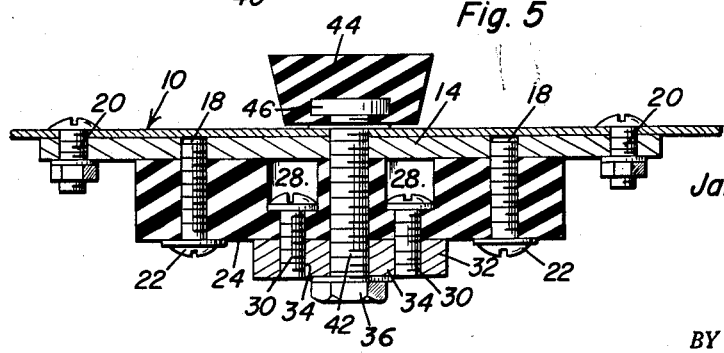
James J. McElhone
Harry McElhone
INVENTORS.

United States Patent Office 2,757,263
Patented July 31, 1956

2,757,263

MASTER SWITCH FOR AUTOMOBILES

James J. McElhone, Darby, Pa., and Harry McElhone, Phoenix, Ariz.

Application March 31, 1954, Serial No. 420,113

2 Claims. (Cl. 200—158)

This invention relates to a master switch for controlling the battery power to electrical circuits of a vehicle so as to provide means for breaking the ground connection of a battery in a rapid and positive manner thereby substantially reducing the time necessary for the disconnection of the ground cable of a battery thereby preventing excessive damage from electrical fires.

The construction of this invention features a ground plate which is adapted to be attached to the cowl, fire wall, or other portion of a vehicle. Attached to the ground plate is a spacer plate which carries a contact plate. A further contact member is threadedly engaged in and electrically connected to the ground plate and the contact plate, while extending through the electrically insulative spacer plate.

When the contact member is in an extended position engaging the contact plate, it completes an operative electrical circuit from the contact plate to the ground plate and hence through the vehicle, thus grounding the battery. However, an insulative knob is provided for the contact member enabling it to be rotated to threadedly remove it from engagement with the contact plate. This breaks the circuit to ground of the ground cable of the battery while also holding the ground cable in position thereby preventing accidental grounding of the ground cable by means of accidental engagement with conductive material of the vehicle.

Other objects and features of this invention reside in the provision of a master switch that is strong and durable, simple in construction and manufacture, capable of being installed on various existing makes and models of automotive vehicles, and which is very inexpensive to produce.

These, together with the various ancillary objects and features of the invention which will become apparent as the following description proceeds, are attained by this switch structure, a preferred embodiment of which has been illustrated in the accompanying drawings, by way of example only, wherein:

Figure 1 is a perspective view of the master switch as operatively installed;

Figure 2 is another perspective view of the master switch comprising the present invention;

Figure 3 is a schematic illustration of the master switch shown electrically connected to the battery;

Figure 4 is a vertical sectional view as taken along the plane of line 4—4 in Figure 1; and Figure 5 is a horizontal sectional view as taken along the plane of line 5—5 in Figure 1.

With continuing reference to the accompanying drawings wherein like reference numerals designate similar parts throughout the various views, reference numeral 10 generally designates a portion of a vehicle such as the cowl thereof, on which it is desired to install the master switch generally designated by the reference numeral 12. The master switch 12 includes a substantially rectangular horizontally elongated ground plate 14, having an outer pair of apertures 16 as well as an inner threaded pair of apertures 18. The ground plate 14 is formed of an electrically conductive material and is secured to the cowl or fire wall by means of bolts or other suitable fasteners 20 which extend through the outer apertures 16. By means of screw fasteners 22 spaced from the bolt fasteners 20 and threadedly engaged in the threaded apertures 18 an electrically insulative spacer plate 24 formed of some suitable material such as Bakelite, is secured to the ground plate 14 in overlying relationship thereto. The spacer plate 24 is of substantially T shape, having a downwardly extending portion 26.

A pair of recesses 28 inwardly spaced from the fasteners 22 are provided, and received in the recesses 28 are screw fastening elements 30 which are adapted to hold a contact plate 32 of vertically elongated rectangular shape and formed of an electrically conductive material to the spacer plate 24. The screw fastening elements 30 are threadedly received in a pair of threaded apertures 34 formed in the contact plate 32.

Threadedly secured in the contact plate 32 as well as the spacer plate 26 is a threaded attaching member comprising a headed screw 36 which is adapted to retain the ground cable 38 of a battery 40 in electrical contact with the contact plate 32.

In order to complete an operative electrical circuit from the contact plate 32 to the ground plate 14, thus grounding the battery 40 to the vehicle, a threaded contact member 42 extends through aligned threaded apertures in the contact plate 32, the spacer plate 24, and the ground plate 14. The knob 44 preferably of Bakelite or other suitable insulative material, is secured over the head portion 46 in any suitable manner and is adapted to be utilized to rotate the contact member 42.

In use, when it is desired to complete an operative electrical circuit from the battery 40 to the ground, the contact member 42 is rotated to the position as is shown in the various figures. However, should it become necessary to disconnect the battery 40 from the ground, it is merely necessary to rotate the knob 44 until the end of the contact member 42 is entirely received within the spacer plate 24 of insulative material thus breaking the contact between the contact plate 32 and the ground plate 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A master switch for controlling the battery powered electrical circuits of a vehicle comprising an electrically conductive ground plate adapted to be attached and grounded to the vehicle, an electrically insulative spacer plate overlying said ground plate, fasteners securing said spacer plate to said ground plate, an electrically conductive contact plate overlying said spacer plate fastening elements securing said contact plate to said spacer plate, said fastening elements being spaced from said fasteners, and an electrically conductive threaded contact member threadedly secured in said ground plate, said spacer plate and said contact plate and adapted to be withdrawn from said contact plate to break the operative electrical circuit between said ground plate and said contact plate, and an insulative knob secured to said threaded contact member for enabling said threaded contact member to be rotated to withdraw said contact member from said contact plate.

2. A master switch for controlling the battery powered electrical circuits of a vehicle comprising an electrically conductive ground plate adapted to be attached and grounded to the vehicle, an electrically insulative spacer plate overlying said ground plate, fasteners securing said spacer plate to said ground plate, an electrically conductive contact plate overlying said spacer plate fastening elements securing said contact plate to said spacer plate, said fastening elements being spaced from said fasteners, and an electrically conductive threaded contact member threadedly secured in said ground plate, said spacer plate and said contact plate and adapted to be withdrawn from said contact plate to break the operative electrical circuit between said ground plate and said contact plate, and an insulative knob secured to said threaded contact member for enabling said threaded contact member to be rotated to withdraw said contact member from said contact plate, and an electrically conductive attaching member threadedly secured to said spacer plate and said contact plate adapted to hold the ground wire of a battery in electrical connection with said contact plate, said attaching member being spaced from said contact member.

References Cited in the file of this patent
UNITED STATES PATENTS

| | | |
|---|---|---|
| 2,605,314 | Schelke | July 29, 1952 |
| 2,674,674 | Rietschel | Apr. 6, 1954 |